United States Patent

Bauer et al.

[11] Patent Number: 5,957,055
[45] Date of Patent: Sep. 28, 1999

[54] CONTAINER-TRANSPORTING SYSTEM WITH RAILS

[75] Inventors: Reinhard Bauer, Güntersleben; Walter Häfel, Rimpar; Edgar Huth, Zellingen; Otto Weis, Oberpleichfeld, all of Germany

[73] Assignee: Noell Stahl-und Maschinenbau GmbH, Würzburg, Germany

[21] Appl. No.: 08/943,733

[22] Filed: Oct. 3, 1997

[30] Foreign Application Priority Data

Oct. 4, 1996 [DE] Germany .......................... 196 41 043
Mar. 6, 1997 [DE] Germany .......................... 197 09 034

[51] Int. Cl.$^6$ .................................................. B60S 13/02
[52] U.S. Cl. .................. 104/35; 104/40; 104/130.01; 246/454; 246/465
[58] Field of Search .................... 104/35, 40, 48, 104/130.01, 130.07; 246/454, 465

[56] References Cited

U.S. PATENT DOCUMENTS

| | | | |
|---|---|---|---|
| 3,672,308 | 6/1972 | Segar | 104/130.01 |
| 3,759,187 | 9/1973 | Gayot | 104/130.07 |
| 4,132,175 | 1/1979 | Miller et al. | 104/130.07 |

FOREIGN PATENT DOCUMENTS 195 03 878  1/1997  Germany .
44 07 999    1/1997  Germany .

*Primary Examiner*—Mark T. Le
*Assistant Examiner*—Robert J. McCarry, Jr.
*Attorney, Agent, or Firm*—Cohen, Pontani, Lieberman & Pavane

[57] ABSTRACT

A container-transporting system with tracks, linear motors and rotatable wheels. The system includes a network of tracks which are arranged transversely at right angles with respect to one another and parallel to one another and form points of intersection. Guide rails are arranged in the tracks outside the points of intersection and have track-bound transporting carriages moving on them by way of running wheels which can be turned about a pivot spindle. The distances between the running wheels correspond to the distances between the tracks. The running wheels, which are enclosed by horizontal guide rollers, can be rotated in the points of intersection. Magnets are arranged on the transporting carriage in the longitudinal and transverse directions and, by way of stators of the track, move the transporting carriage in the longitudinal and transverse directions. Pivoting slides, which are arranged on the transporting carriage, turn the running rollers.

7 Claims, 10 Drawing Sheets

CONTAINER-TRANSPORTING SYSTEM WITH RAILS

BACKGROUND OF THE INVENTION

1. Field of the Invention

The invention relates to a container-transporting system having rails on a track, a linear motor and turnable wheels.

2. Description of the Prior Art

The invention can be used wherever containers are moved in a fully automatic manner by way of rail-bound linear-motor-driven transporting carriages. The invention is suitable for transportation in the longitudinal and transverse directions on predetermined, level terrain where it is necessary, in an environmentally friendly manner and without any significant amount of maintenance, to move containers quickly in the longitudinal and transverse directions. For example, the invention is useful in sorting stations in unloading facilities in docks or else between ships and road vehicles or rail vehicles or between any number of one of these types of vehicle.

Installations for transporting containers on flat terrain are known. For example, German reference DE 44 07 999 A1 describes a running-gear unit which is intended for any desired changes in direction without switches and is suitable for use in automatic multi-story car parking garages. By means of linear-drive mechanisms, load-bearing pallets are transported in different directions, longitudinally and transversely, on guide profiles. The installation has the disadvantage that pivotable supporting rollers, which are arranged at the corners of the pallets, are not suitable for the very high loads transported in containers, since the energy required for pivoting the rollers is very high. Furthermore, a wide track is required in order to change the direction of the rollers for travelling in the opposite direction.

Furthermore, German reference DE 195 03 878 A1 proposes an installation which is intended for changes in direction without points and in which pivotable supporting rollers, which are enclosed by a single guide element, are arranged on pallets which can transport containers. In this example too, the installation is one in which, by means of pivoting rollers at all four corners, pallets are moved by linear motor, and the above mentioned disadvantages of the prior art are not eliminated.

SUMMARY OF THE INVENTION

Accordingly, it is an object of the present invention to provide a container-transporting system which, using narrow tracks and with a low degree of outlay in terms of energy and equipment, can move high loads, without disruption, in the longitudinal and transverse directions by way of linear motors.

Pursuant to this object, and others which will become apparent hereafter, one aspect of the present invention resides in a container-transporting system with tracks, linear motors and turnable wheels, in which the tracks are arranged parallel to one another and transversely with respect to one another to form points of intersection. Guide rails are arranged centrally in the tracks outside of the points of intersection.

The tracks may be designed as rails, along which the transporting carriage for containers travels by way of the running surfaces of the respectively central running wheels.

In another embodiment, a small running wheel is arranged between larger running wheels. In this case, all three running wheels can turn independently of one another on a spindle. However, it is also advantageous to design the running wheels as double disk wheels which, for their part, roll on running surfaces.

The turnable running rollers are enclosed by horizontal guide rollers. The distances between the running rollers corresponds to the distances between the tracks. It is possible for the running rollers, along with the guide rollers enclosing them, to be turned in the points of intersection. When travelling on rectilinear sections, the horizontal guide rollers rest against the guide rails and thus cause only the central running rollers, and the central part of the running rollers, to come into contact with the guide rails. This results in a freewheeling of the lateral guide rollers, or of the lateral part of the guide rollers.

Alongside the tracks, stators are arranged in the longitudinal and transverse directions with respect to the transporting carriages. The stators interact with magnets, which are arranged longitudinally and transversely on the transporting carriage, and ensure that the transporting carriage moves forward in the longitudinal and transverse directions. Furthermore, stators which act on pivoting slides arranged on the transporting carriages are arranged parallel to the tracks. The result of the adjustment of the pivoting slides on the transporting carriage, via linkages and pivoting linkages, is that the running rollers are turned through 90° in each case in the points of intersection, this permitting a change in direction of the carriage.

For reliable functioning of the installation, it is sufficient if horizontal guide rollers are arranged only around three running-roller pairs.

As soon as the linear-motor-driven transporting carriage reaches a point of intersection, which is indicated by sensors which are arranged to provide full surface coverage, the transporting carriage is retained in the point of intersection by low-power-operated stators in the longitudinal and transverse directions, stators for the pivoting slides actuating said slides. The linkages extending from the pivoting slides, together with pivoting linkages, actuate in each case two double-disk-wheel pairs via in each case one pivot slide, the wheel pairs turning in the points of intersection. The transporting carriage is retained in the point of intersection by the stators until such time as the running rollers have turned through 90°. Thereafter, the transporting carriage can leave the points of intersection and travel transversely with respect to its longitudinal direction via the stators.

For the case where a transporting carriage is to be parked securely in the transporting-container system, this takes place by all the double disk wheels being turned through only 45° in the point of intersection, with the result that it is not possible for the transporting carriage to move accidentally.

It is advantageous to use sensors for controlling the transporting carriages, and, in order for the system to function satisfactorily in any position of the transporting carriage, it is necessary for at least one sensor to be arranged between the guide rails beneath the transporting carriage. Guidance of the running wheels by means of linkages means that all four running-wheel pairs on the transporting carriage turn simultaneously and uniformly, without any of the wheels trailing. Furthermore, the proposed container-transporting system allows containers with very high loads to be moved on tracks which are not very wide.

It is advantageous to design the transporting carriage as a double pallet and to provide damping devices on the transporting carriage, for example springs, rubber elements, shock absorbers or other resilient devices. These prevent deformation of the transporting carriage when a crane sets down the containers quickly. Such deformation could render the linear-motor system operationally unreliable.

It is also advantageous to design the tracks as a modular construction system and to supplement and extend them.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
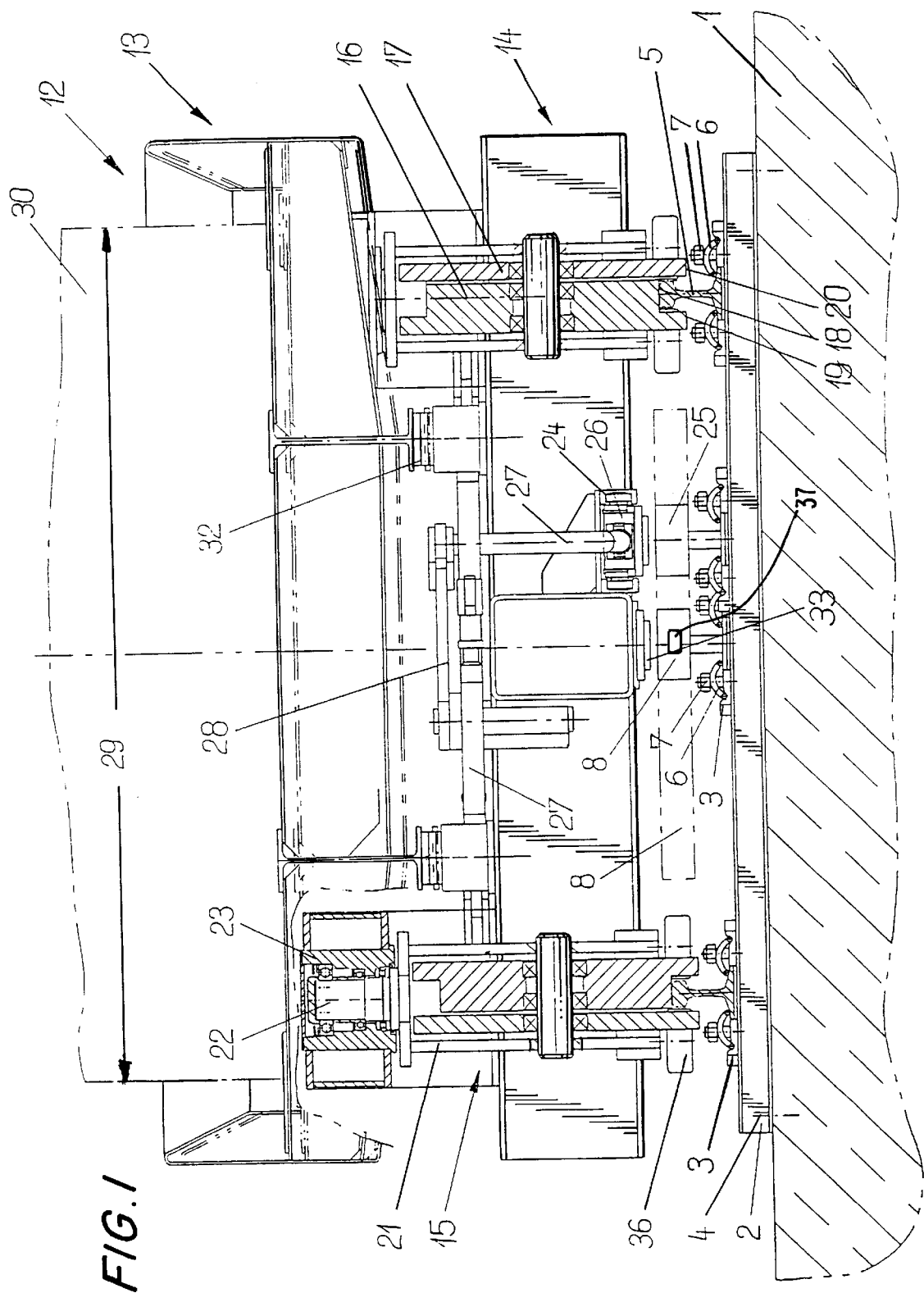
FIG. 1 shows a cross section of the rail construction and of the transporting carriage.
Figure 2:
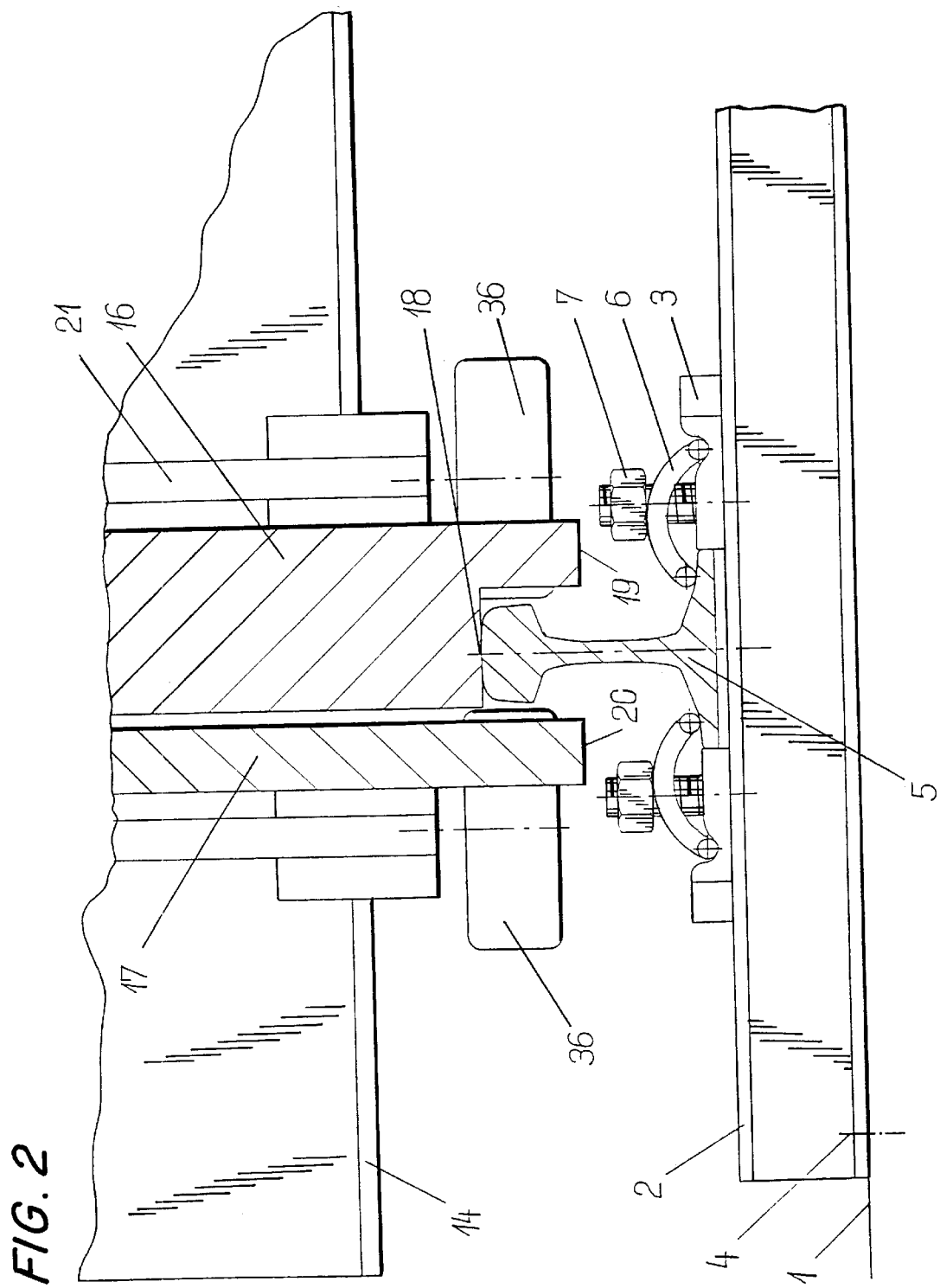
FIG. 2 shows the rail construction with the transporting-carriage wheels.
Figure 3:
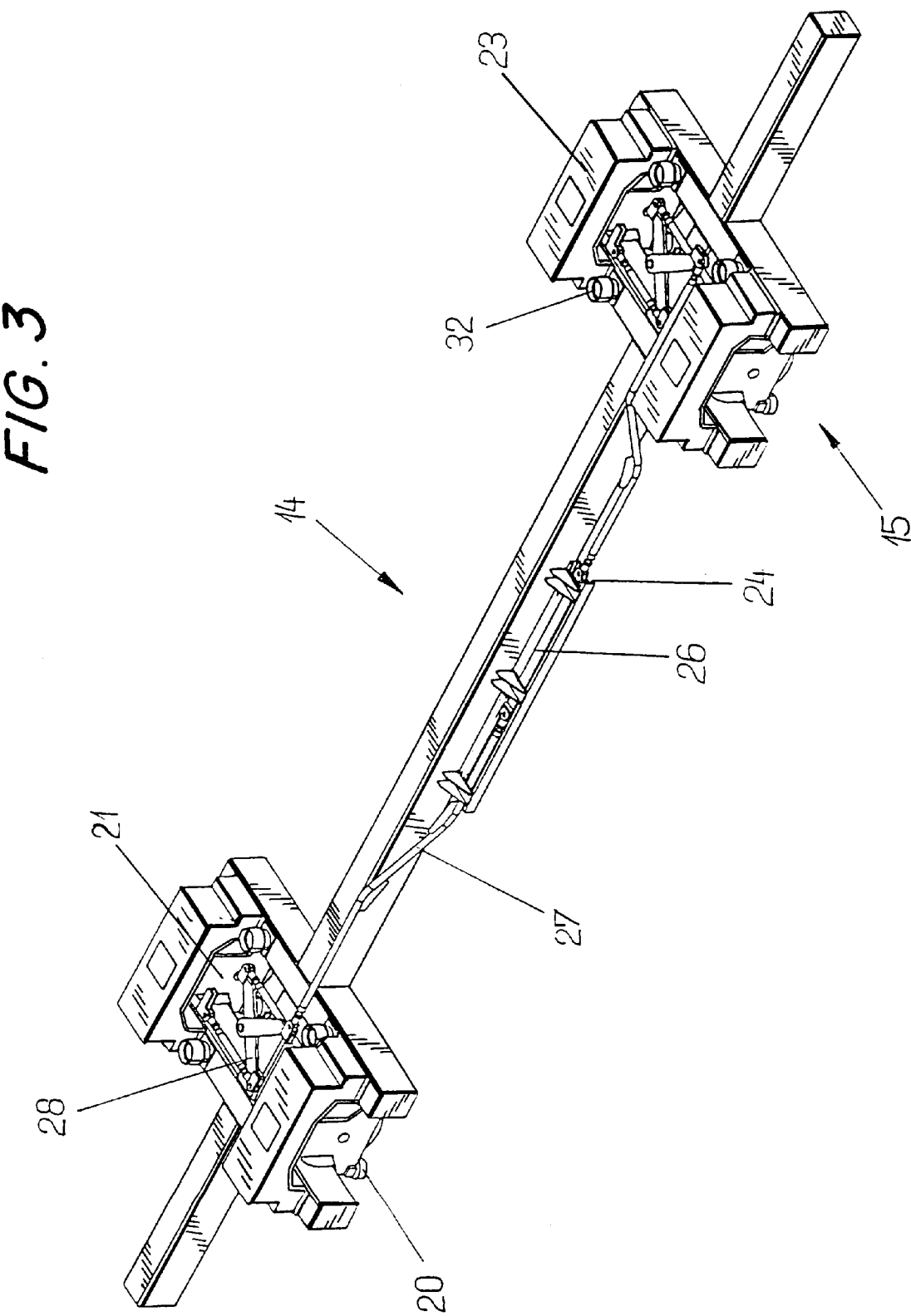
FIG. 3 shows an isometric view of the undercarriage with pivoting means, a crossmember and a wheel housing.
Figure 4:
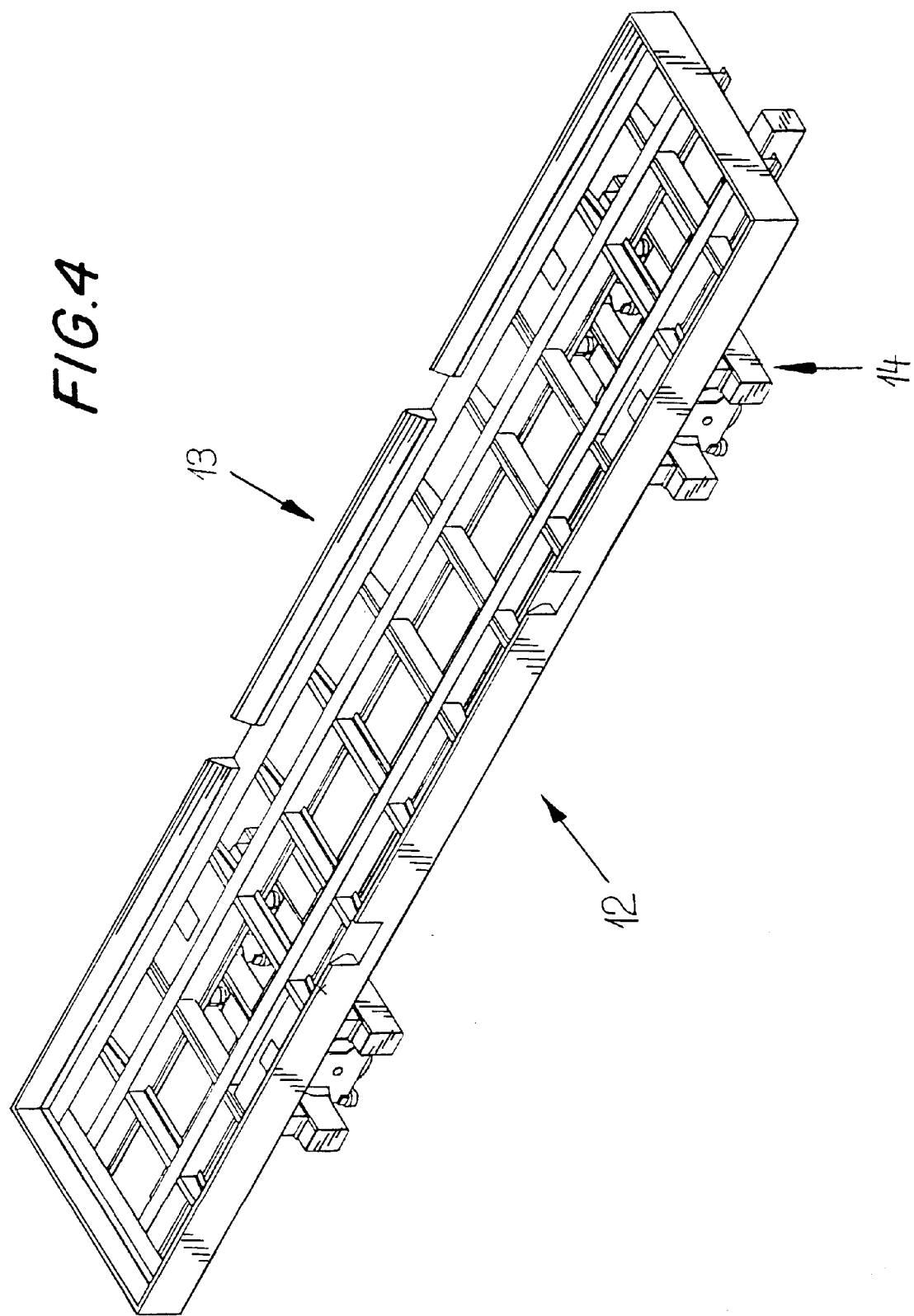
FIG. 4 shows an isometric view of the transporting carriage with a superstructure and an undercarriage.
Figure 5:
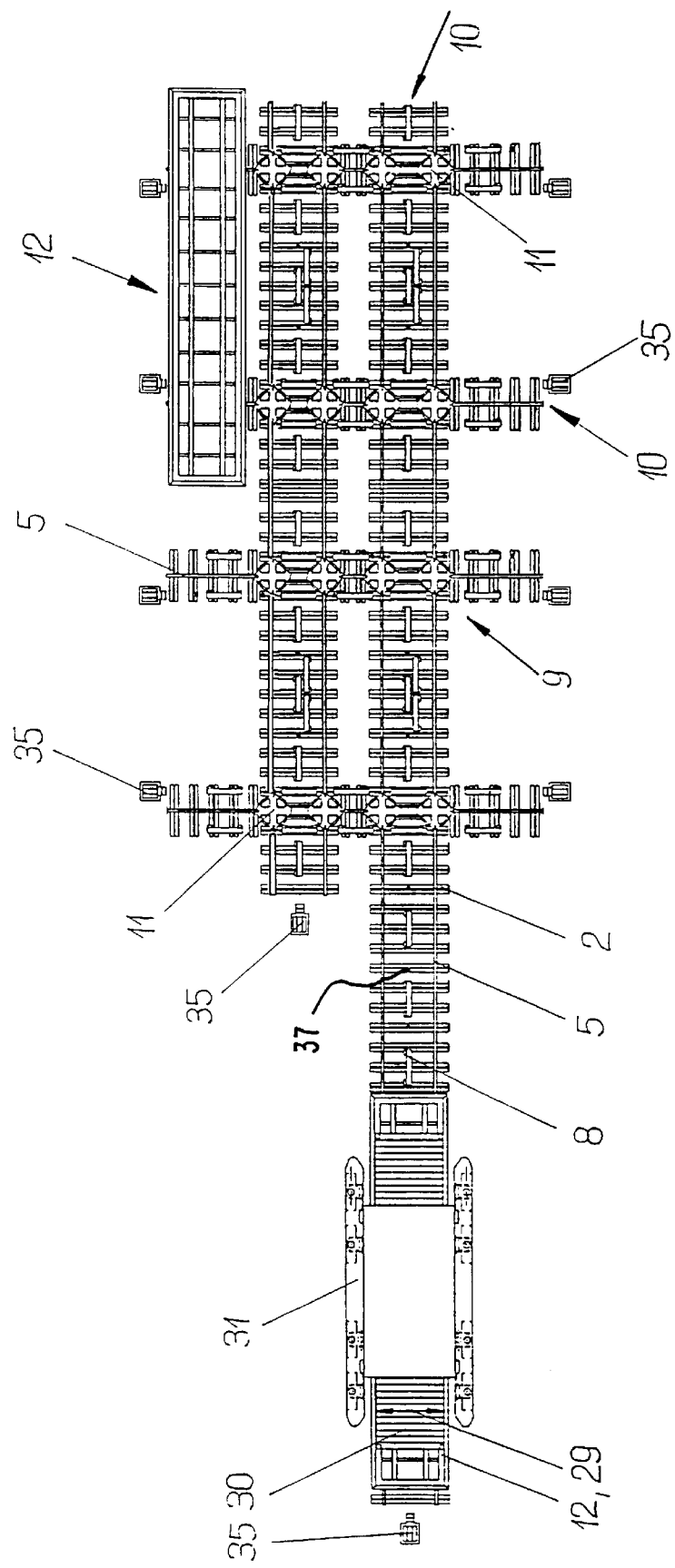
FIG. 5 shows a plan view of part of the track with longitudinal and transverse rails, steel sleepers, pivoting plates and buffers and a transfer location with a transporting carriage and a straddle carrier.

The cross section of the rail construction illustrated in FIG. 1 shows a prepared level surface 1, consisting of concrete, bitumen or ballast, on which steel sleepers 2 with rail-retaining parts 3 have been laid at intervals, in accordance with the loading, and fastened by fastening means 4. Rails 5 have been introduced into the rail-retaining parts 3 and are retained via a spring element 6 and screws 7. With the same arrangement of a rail-retaining part 3, a spring element 6 and screws 7, linear-motor stators 8, 25 are fastened on the steel sleepers 2. This allows the stators 8, 25 to be displaced continuously in the longitudinal direction in accordance with their relative magnetic arrangement.

In the region of intersection 9 of the track 10, shaped plates 11 are positioned on the steel sleepers 2 and fastened by screws 7. In order to provide for the smooth transfer from the rail 5 onto the shaped plate 11, bevelled rail end pieces are provided on the shaped plate 11.

The transport carriage 12 for a container 30 is positioned on the rails 5 by way of turnable wheels 15. The carriage 12 comprises a superstructure 13, which allows deformation, and a rigid undercarriage 14, with a plurality of damping elements 32, for the magnets 33. The turnable wheels 15 are designed as double disk wheels 16, 17. The disk wheel 16 is designed with running surfaces 18 for the rail 5 and a running surface 19 for the shaped plate 11. In contrast, the running surface 20 of the disk wheel 17 is only used on the shaped plate 11. The lateral guide means of the turnable wheels 15 are mounted in a crossmember 23 via a wheel housing 21 and a pivot spindle 22. The crossmember 23 is connected in a frictionally locking manner to the undercarriage 14.

The movement of the turnable wheels 15 is executed via a displacement carriage 26, which is moved in a U-profile 24 by the stator 25, and is transmitted, via linkages 27 and articulation levers 28, into the wheel housing 21. Since the turnable wheels 15 are mounted within the width 29 of the container 30, it is possible for the container 30 to be received by a commercially available spreader-equipped container vehicle, e.g. a straddle carrier 31.

Figure 6:
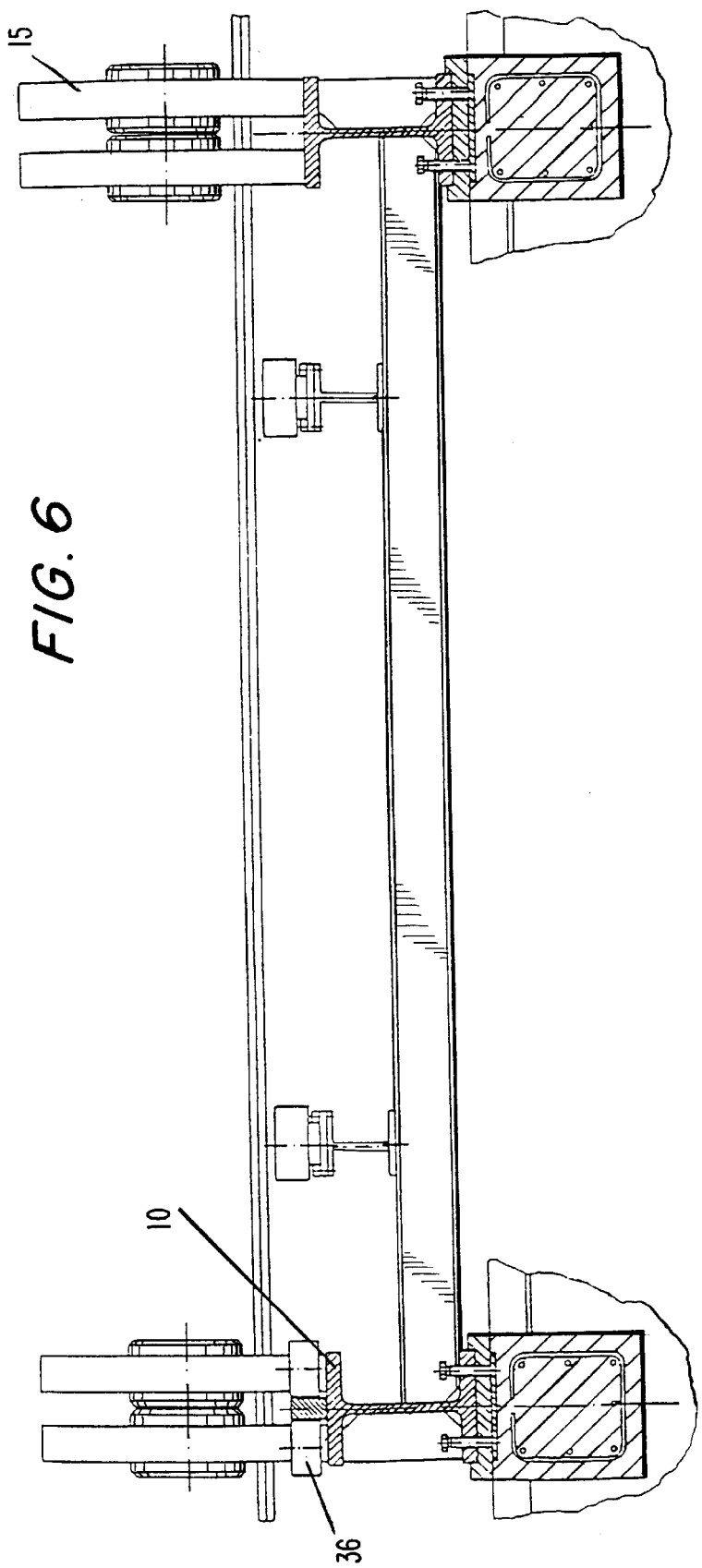
FIG. 6 shows an illustration of two turnable wheel pairs with guide rollers of one wheel pair on tracks with a guide rail.

FIG. 6 shows another embodiment of the invention, in which the wheels 15 move on the tracks 10 and, centrally with respect to the rail 5, are guided on the rail 5 via horizontal guide rollers 36.

The transportation sequence using the installation according to the invention takes place in the following manner:

A container-loading bridge (not illustrated) positions the container 30 on the superstructure 13 of the transporting carriage 12. The impact caused by this operation is damped via a plurality of the damping elements 32. The transporting carriage 12 moves by virtue of the stators 8 being supplied with power. Once the transporting carriage 12 has reached the shaped plate 11 and is braked, the displacement carriage 26 is actuated by virtue of the stator 25 being supplied with power, and all the wheels 15 are pivoted via linkages. The travel of the transporting carriage 12 continues by supplying the stators 8 which are responsible for transverse travel with power. End buffers 35 are installed as a safety means for the tracks 10.

The following FIGS. 7 to 10 show how a change in direction is brought about by the permanent magnets 33, arranged longitudinally and transversely with respect to the rail 5, and by the displacement carriage 26 on the transporting carriage 12.

Figure 7:
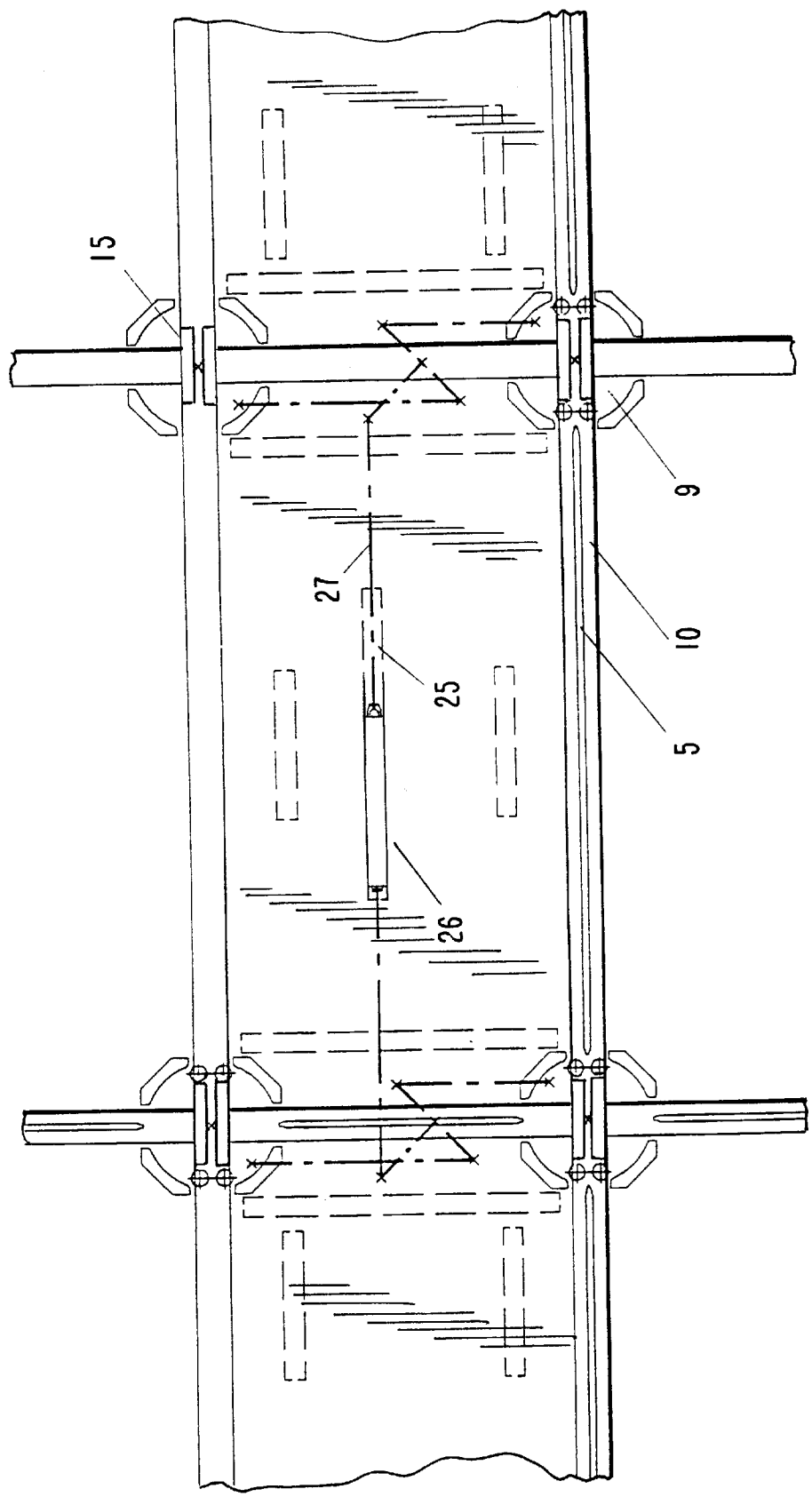
FIG. 7 shows a transporting carriage in the region of intersection with the wheels beginning to pivot.

FIG. 7 shows the container-transporting system according to the invention, which comprises points of intersection 9, it being the case that only every second track has a rail 5. The rail 5 is only provided outside the points of intersection 9, so as not to obstruct turning of the wheels 15. The transporting carriage 12 is located in the point of intersection 9. For the purpose of turning the wheels 15 in the points of intersection 9, use is made of the displacement carriage 26, which transmits its movements to the wheels 15 via the linkages 27. The displacement carriage 26 is actuated via the stator 25 located alongside, and between, the tracks 10. Guide elements are arranged at the points of intersection 9 and guide the horizontal guide rollers 36 as they turn.

Figure 10:
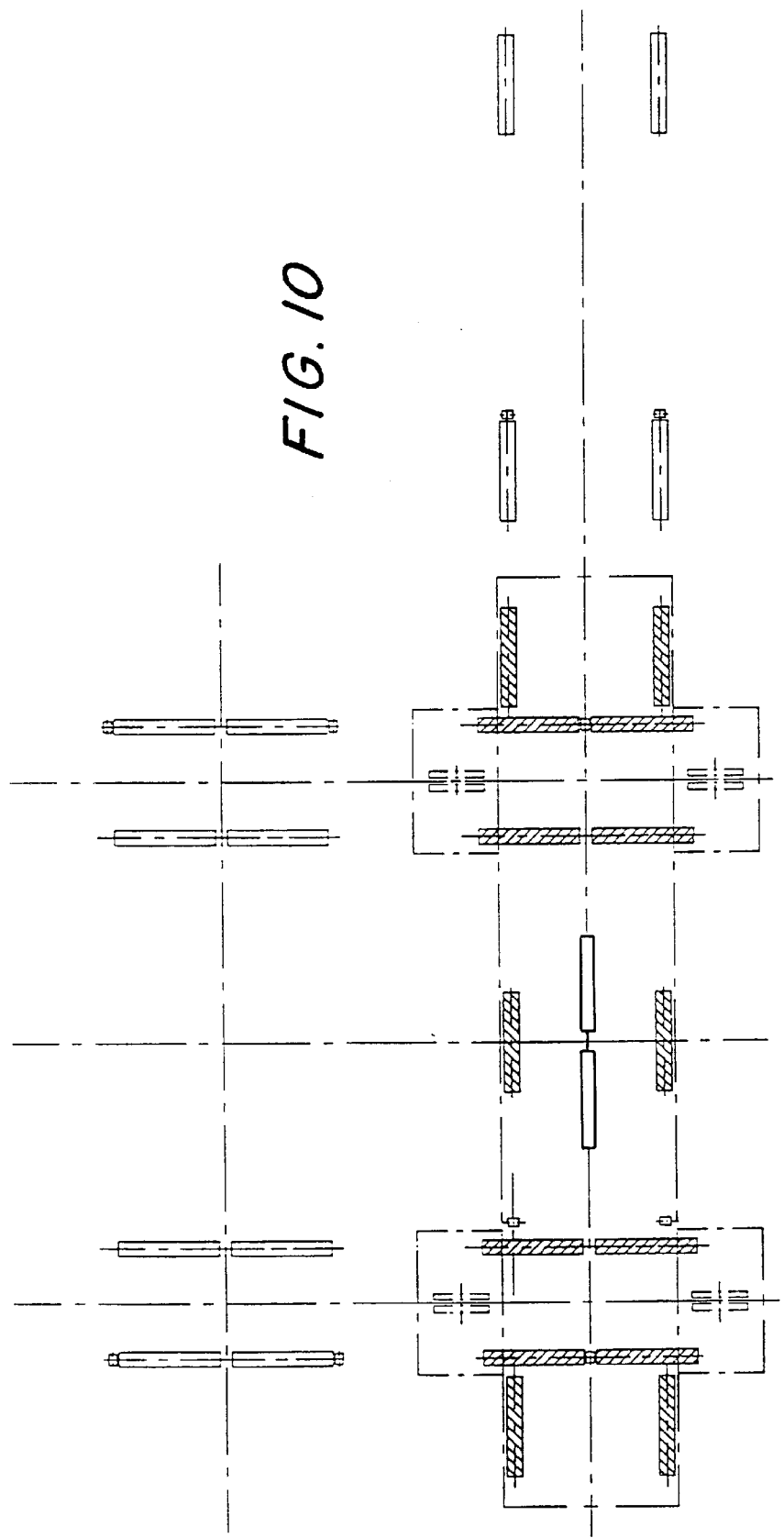
FIG. 10 shows the stator power supply for FIG. 9.

On the approach to a first point of intersection 9, power is supplied to in each case a number of stators 25 along the track 10, which transport the carriage 12. For the purpose of detecting the transporting carriage 12, use is made, for longitudinal and transverse travel, in each case of sensors 37 (Hall sensors) which are arranged such that there is always a sensor located beneath the transporting carriage 12. These sensors 37, which are arranged to provide full surface coverage, ensure that the stators 25 are always switched on and off at the appropriate point in time in order for the desired travel of the transporting carriage 12 to be executed. As soon as the points of intersection 9 have been reached, the corresponding stator 25 is additionally supplied with power. The transporting carriage 12 comes to a standstill in the points of intersection 9, with the result that all four wheels 15 can turn. The wheels 15 are turned by means of the displacement carriages 26, via the linkages 27. In addition to the stators 25 in the longitudinal direction being supplied with power, power is also supplied to the stators 25 in the transverse direction (FIG. 10). The stator 25 results in the displacement carriage 26 being actuated and thus in the wheels 15 being turned in the points of intersection 9. The stators 25 secure the transporting carriage 12 in its position for the purpose of turning the wheels 15. A 45°-position of the wheels can advantageously be used for controlled parking in the point of intersection 9.

Figure 8:
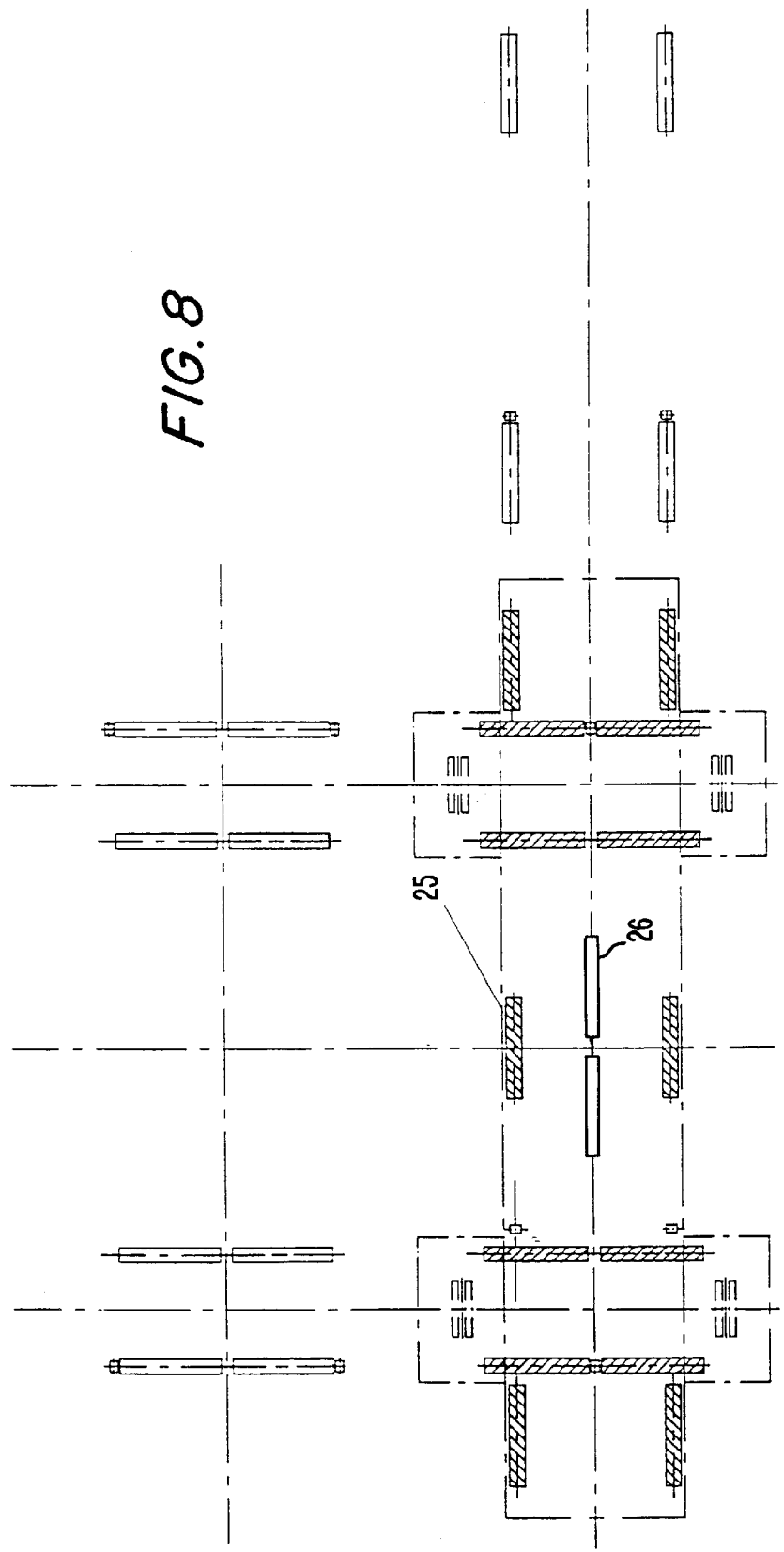
FIG. 8 shows the stator power supply for FIG. 7.
Figure 9:
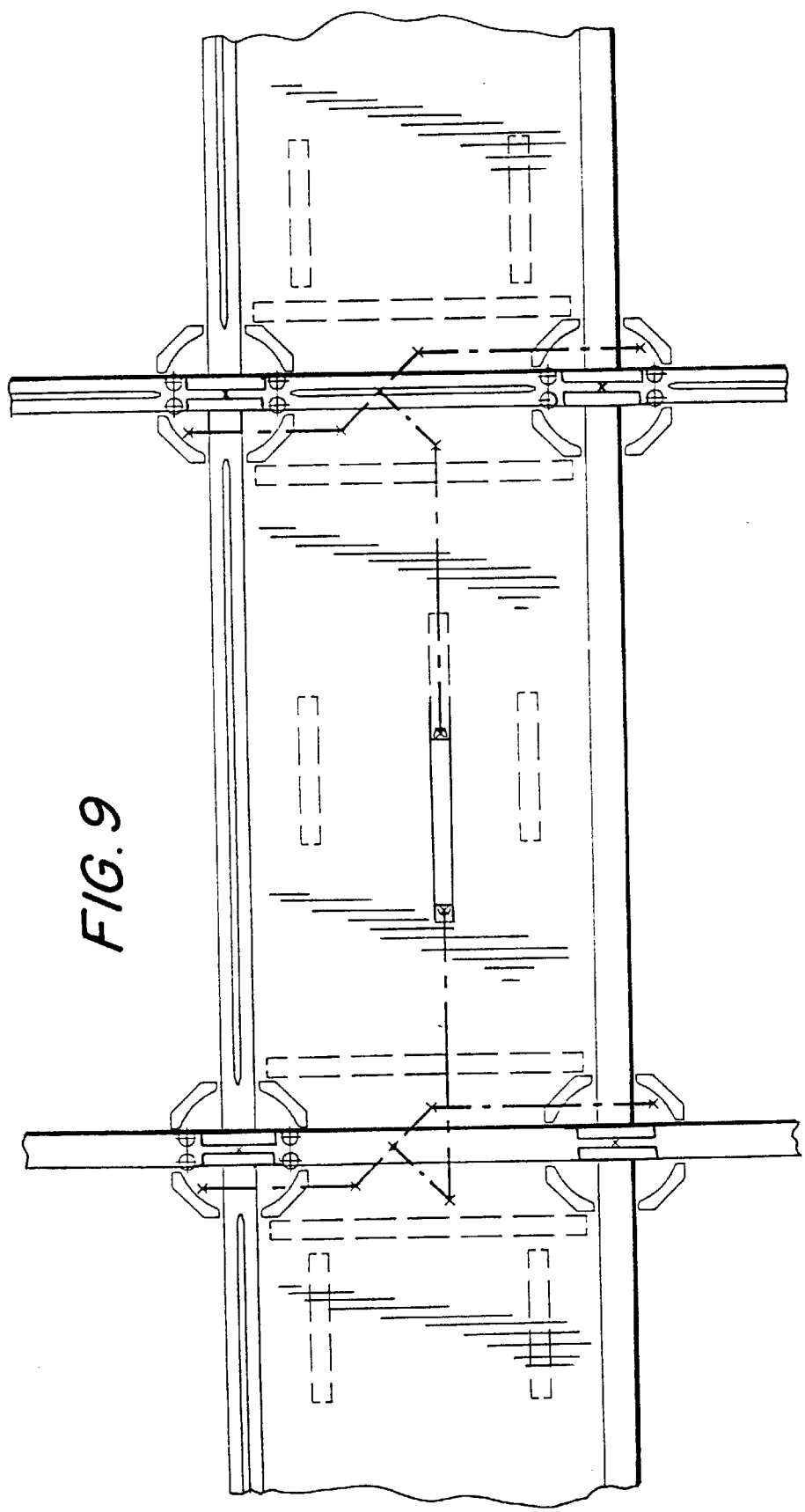
FIG. 9 shows a transporting carriage in the region of intersection with the running wheels pivoted in the point of intersection.

FIG. 8 shows that, for the movement in FIG. 7, all the stators 25 have to be supplied with power. Once the wheel pairs 15 have been turned through 90°, the wheel pairs 15 reach the position, transverse with respect to the longitudinal direction of the transporting carriage 12, which is shown in FIG. 9. The stators 25 supplied with power are illustrated in FIG. 10. Thereafter, the transporting carriage 12 can be moved on the tracks 10 transversely with respect to its longitudinal direction. For this purpose, the power is supplied to the stators 25 transverse with respect to the transporting carriage 12 (not illustrated).

The invention is not limited by the embodiments described above which are presented as examples only but can be modified in various ways within the scope of protection defined by the appended patent claims.

We claim:

1. A container-transporting system, comprising:
    a network of tracks arranged transversely at right angles with respect to one another and parallel to one another, so as to form points of intersection, the network of tracks including rails arranged outside the points of intersection;
    a transporting carriage including a pivot spindle, wheels mounted to the pivot spindle so as to be turnable about the pivot spindle, and horizontal guide rollers, the wheels being arranged to have a distance therebetween that corresponds to the distance between the rails, the wheels being turnable in the points of intersection via the guide rollers;
    stators arranged on at least one of the tracks; magnets arranged on the transporting carriage in both longitudinal and transverse directions so as to operatively cooperate with the stators so as to move the transporting carriage in the longitudinal and transverse directions;
    a displacement carriage on the transporting carriage; and
    a linkage and an articulated lever operatively mounted on the displacement carriage between the wheels and the guide rollers so as to turn the wheels with the horizontal guide rollers.

2. A system according to claim 1, wherein the wheels on the transporting carriage are double disk wheels, a first one of the double disk wheels having a central running surface configured to roll on the rails and a second one of the double disk wheels having running surfaces configured to roll on the points of intersection.

3. A system according to claim 1, wherein the stators include stators for the displacement carriage arranged parallel to the tracks.

4. A system according to claim 1, and further comprising a plurality of shaped plates, each shaped plate of the plurality of shaped plates being respectively arranged at one said point of intersection of the tracks, the horizontal guide rollers being arranged around only three of the wheels so as to be guided in the shaped plates.

5. A system according to claim 2, wherein in each case two double disk wheels are arranged so as to be actuable via the displacement carriage.

6. A system according to claim 1, and further comprising sensor means for controlling the stators, the sensor means including sensors and being operatively arranged to provide full surface coverage between the rails, so that there is always a sensor located beneath the transporting carriage.

7. A system according to claim 1, wherein the transporting carriage comprises a superstructure, an undercarriage and damping elements between the superstructure and the undercarriage.

* * * * *